US010099367B2

(12) United States Patent
Hirabayashi

(10) Patent No.: US 10,099,367 B2
(45) Date of Patent: Oct. 16, 2018

(54) ROBOT ARM AND ROBOT

(71) Applicant: Seiko Epson Corporation, Tokyo (JP)

(72) Inventor: Tomokazu Hirabayashi, Hara (JP)

(73) Assignee: Seiko Epson Corporation (JP)

( * ) Notice: Subject to any disclaimer, the term of this patent is extended or adjusted under 35 U.S.C. 154(b) by 8 days.

(21) Appl. No.: 14/481,072

(22) Filed: Sep. 9, 2014

(65) Prior Publication Data

US 2015/0068349 A1    Mar. 12, 2015

(30) Foreign Application Priority Data

Sep. 10, 2013  (JP) ................. 2013-187149

(51) Int. Cl.
| | | |
|---|---|---|
| *B25J 17/00* | (2006.01) | |
| *B25J 17/02* | (2006.01) | |
| *B25J 18/00* | (2006.01) | |
| *B25J 9/12* | (2006.01) | |
| *B25J 19/00* | (2006.01) | |

(52) U.S. Cl.
CPC ................ *B25J 9/12* (2013.01); *B25J 9/126* (2013.01); *B25J 17/00* (2013.01); *B25J 19/0025* (2013.01); *Y10S 901/09* (2013.01); *Y10S 901/20* (2013.01); *Y10S 901/25* (2013.01); *Y10S 901/28* (2013.01); *Y10S 901/46* (2013.01); *Y10T 74/20317* (2015.01)

(58) Field of Classification Search
CPC ........ B25J 9/126; B25J 17/00; B25J 17/0241; Y10T 74/20317; Y10S 901/28
USPC ............... 74/490.01, 490.02, 490.05, 490.06
See application file for complete search history.

(56) References Cited

U.S. PATENT DOCUMENTS

| | | |
|---|---|---|
| 3,419,158 A | 12/1968 | Lemelson |
| 3,610,438 A | 10/1971 | Opdahl |
| 3,985,238 A | 10/1976 | Nakura et al. |
| 4,507,046 A | 3/1985 | Sugimoto et al. |
| 5,207,114 A | 5/1993 | Salisbury, Jr. et al. |
| 5,327,790 A | 7/1994 | Levin et al. |

(Continued)

FOREIGN PATENT DOCUMENTS

| | | |
|---|---|---|
| CN | 2833891 Y | 11/2006 |
| DE | 3034912 A1 | 4/1981 |

(Continued)

*Primary Examiner* — Jake Cook
(74) *Attorney, Agent, or Firm* — Harness, Dickey & Pierce, P.L.C.

(57) ABSTRACT

A joint driving device includes: a reduction gear output shaft that transmits a torque to a second link; a transmission shaft that transmits reaction of the torque to a first link; a transmission shaft outer cylinder arranged on the outer circumference of the transmission shaft and connected to the transmission shaft; a reduction gear output shaft outer cylinder arranged in the outer circumference of the reduction gear output shaft and connected to the reduction gear output shaft; and a wire body arranged between the first link and the second link and including at least one of a wire and a pipe. The transmission shaft includes the motor frame as at least a part. The wire body is housed in a space between the transmission shaft outer cylinder and the transmission shaft, and a space between the reduction gear output shaft outer cylinder and the reduction gear output shaft.

18 Claims, 12 Drawing Sheets

(56) References Cited

U.S. PATENT DOCUMENTS

| | | | |
|---|---|---|---|
| 5,669,269 A * | 9/1997 | Katamine | B25J 9/102 |
| | | | 414/918 |
| 5,806,169 A | 9/1998 | Trago et al. | |
| 6,153,828 A | 11/2000 | Murata et al. | |
| 6,753,628 B1 | 6/2004 | Neal | |
| 6,844,636 B2 | 1/2005 | Lieu et al. | |
| 7,154,200 B2 | 12/2006 | Neal | |
| 7,230,402 B2 | 6/2007 | Kumagai et al. | |
| 7,253,578 B2 | 8/2007 | Kumagai et al. | |
| 7,299,713 B2 * | 11/2007 | Uematsu | B25J 19/0029 |
| | | | 248/51 |
| 7,347,120 B2 * | 3/2008 | Friedrich | B25J 9/044 |
| | | | 414/744.5 |
| 7,673,536 B2 * | 3/2010 | Tamura | B25J 9/046 |
| | | | 318/568.1 |
| 8,266,979 B2 | 9/2012 | Yonehara et al. | |
| 8,525,460 B2 | 9/2013 | Reiland et al. | |
| 8,540,748 B2 | 9/2013 | Murphy et al. | |
| 8,584,547 B2 | 11/2013 | Sirkett et al. | |
| 8,701,513 B2 | 4/2014 | Rosengren et al. | |
| 8,720,296 B2 | 5/2014 | Yonehara et al. | |
| 8,763,489 B2 | 7/2014 | Kirihara et al. | |
| 8,839,689 B2 | 9/2014 | Long | |
| 8,863,607 B2 * | 10/2014 | Kume | F16L 3/08 |
| | | | 138/106 |
| 2002/0062179 A1 | 5/2002 | Matsuda et al. | |
| 2004/0149064 A1 | 8/2004 | Narita et al. | |
| 2005/0193854 A1* | 9/2005 | Sanemasa | B25J 19/0029 |
| | | | 74/490.02 |
| 2006/0182595 A1 | 8/2006 | Lundstrom et al. | |
| 2009/0114052 A1* | 5/2009 | Haniya | B25J 9/0087 |
| | | | 74/490.03 |
| 2010/0313694 A1* | 12/2010 | Aoki | B25J 19/0029 |
| | | | 74/490.02 |
| 2011/0000737 A1* | 1/2011 | Nagase | B62D 5/0406 |
| | | | 180/444 |
| 2011/0052432 A1* | 3/2011 | Cunningham | F04D 13/10 |
| | | | 417/423.3 |
| 2011/0107866 A1 | 5/2011 | Oka et al. | |
| 2011/0174108 A1 | 7/2011 | Graham et al. | |
| 2011/0190934 A1 | 8/2011 | Reiland et al. | |
| 2011/0252913 A1* | 10/2011 | Ibayashi | B25J 19/0025 |
| | | | 74/490.02 |
| 2012/0039729 A1 | 2/2012 | Horng et al. | |
| 2012/0176007 A1 | 7/2012 | Takeuchi | |
| 2012/0279343 A1 | 11/2012 | Ihrke et al. | |
| 2012/0286629 A1 | 11/2012 | Johnson et al. | |
| 2013/0152722 A1* | 6/2013 | Kumagai | B25J 9/0018 |
| | | | 74/490.01 |
| 2013/0334906 A1* | 12/2013 | Sonoda | H02K 5/225 |
| | | | 310/43 |
| 2013/0340560 A1 | 12/2013 | Burridge et al. | |
| 2014/0021808 A1 | 1/2014 | Palfenier et al. | |
| 2014/0076089 A1 | 3/2014 | Long | |
| 2014/0102240 A1* | 4/2014 | Inada | B25J 17/0283 |
| | | | 74/490.02 |
| 2014/0137691 A1 | 5/2014 | Nogami et al. | |
| 2014/0150592 A1 | 6/2014 | Kremerman | |
| 2015/0122073 A1 | 5/2015 | Maisonnier | |
| 2015/0156927 A1 | 6/2015 | Tsuboi | |
| 2015/0367509 A1 | 12/2015 | Georgeson | |

FOREIGN PATENT DOCUMENTS

| | | | |
|---|---|---|---|
| DE | 3022162 A1 | | 12/1981 |
| EP | 0136719 A2 | | 4/1985 |
| JP | 58-149196 A | | 9/1983 |
| JP | 60-024888 | | 2/1985 |
| JP | 60-167796 A | | 8/1985 |
| JP | 60-153792 | | 10/1985 |
| JP | 61-001234 A | | 1/1986 |
| JP | 61-061194 | | 4/1986 |
| JP | 62-241689 | | 10/1987 |
| JP | 01-131494 A | | 5/1989 |
| JP | 2-97592 | * | 8/1990 |
| JP | 02-097592 U | | 8/1990 |
| JP | 04-315592 B2 | | 11/1992 |
| JP | 05-237789 A | | 9/1993 |
| JP | 05-253171 A | | 10/1993 |
| JP | 09-141593 | | 6/1997 |
| JP | 09-285980 | | 11/1997 |
| JP | 11-104987 A | | 4/1999 |
| JP | 11-216698 | | 8/1999 |
| JP | 2000-006065 A | | 1/2000 |
| JP | 2000-014087 A | | 1/2000 |
| JP | 2000-092772 A | | 3/2000 |
| JP | 2004-222411 A | | 8/2004 |
| JP | 2006-159302 A | | 6/2006 |
| JP | 2006-187841 A | | 7/2006 |
| JP | 2007-144559 A | | 6/2007 |
| JP | 2010-161891 A | | 7/2010 |
| JP | 2010-167515 A | | 8/2010 |
| JP | 2010-284777 A | | 12/2010 |
| JP | 2011-177010 A | | 9/2011 |
| JP | 2012-035372 A | | 2/2012 |
| JP | 2012-147579 A | | 8/2012 |
| JP | 2012-196768 A | | 10/2012 |
| WO | WO-2004-078423 A1 | | 9/2004 |
| WO | WO-2006136827 A1 | | 12/2006 |

* cited by examiner

ROBOT ARM AND ROBOT

CROSS-REFERENCE TO RELATED APPLICATION

This application claims priority to Japanese Patent Application No. 2013-187149 filed Sep. 10, 2013 which is hereby expressly incorporated by reference herein in its entirety.

BACKGROUND

Technical Field

The present invention relates to a joint driving device a robot.

Related Art

In a vertical multi-joint type robot, in which a plurality of links are connected by turning joints, and a scalar type robot, the following plurality of lines have to be provided between a base and a tip of an arm: a power line and a signal line for driving a motor; a signal line for driving equipment, such as a hand, that is operated by a user; an air tube; and a high speed communication line for using a camera that detects an object.

PCT publication No. 2004-078423 discloses that a turning center of a turning joint has a vacant space (hole). Because wiring lines and tubes pass through the vacant space (hole) turning center, a motor, reduction gears and a shaft bearing are formed in a single integral unit.

JP publication No. 2010-284777 discloses a method that reduces a risk of breaking of wire and friction wear because a load to wiring lines and tubes decreases by absorbing a rotary motion of a joint by a U-shaped bent structure. Specifically, a plurality of cables, which is in a flat shape with a U-shaped bent state, are located in a turning side cable guide that is folded a turning shaft of a servomotor back to a motor side.

However, in the PCT publication No. 2004-078423, when the hole through which the wiring lines and tubes pass is provided at a center of an input-output shaft of the reduction gears and the motor shaft, a size of the joint in a radial direction increases so that an arm is thicken and an arm weight increases. Further, when the hole through which the wiring lines and tubes pass is provided at the center of the input-output shaft of the reduction gears and the motor shaft, an outer diameter of the motor shaft rotating in high speed and an outer diameter of the input-output shaft of the reduction gears increase. As a result, because circumferential speed of those shafts increases, grease and a lubricant for a motor shaft bearing and the reduction gears are spilled and friction heat from a contact area between a grease seal lip part and a high speed rotation shaft increases. That problem limits joint operation speed. Further, acceleration of the joint is limited because a torque generated by the motor is consumed by increased frictional resistance. Further, when the hole through which the wiring lines and tubes pass is provided at the center of the input-output shaft of the reduction gears and the motor shaft, the acceleration of the joint is limited because a motor torque is consumed at the time of acceleration and deceleration because inertia on a side of the input-output shaft of the reduction gears. Because the above problems become more serious for a joint driving device with a smaller shaft diameter and a small capacity, the above vacant space (hole) wiring structure is not appropriate to a joint mechanism of a small robot.

In JP publication No. 2010-284777, a motor cover is provided at an outer circumference of the servomotor. Because the cable guide is located at the outer circumference, a space is required between the motor and the motor cover. As a result, an outer diameter of the joint increases. Further, because the cable, which is in a flat shape, is located along with the cable guide in a shaft direction, another space for arranging the cable in the shaft direction. As a result, a width of the joint increases. According to the above described reasons, this method is applied to a limited area, such as a base of a robot arm, because the space is required for storing the wiring lines and tubes.

SUMMARY

The present invention is for resolving at least some of the above problems. Thus, the present invention can be realized via the following embodiments and application examples.

APPLICATION EXAMPLE 1

A joint driving device in this application example is a joint driving device in which a first link and a second link relatively turn. The joint driving device includes: a motor including a rotor, a rotor shaft, a stator, a motor frame, and a bearing that supports the rotor shaft; a reduction gear that decelerates rotation from the motor and increases and outputs a torque output of the turning; a reduction gear output shaft that transmits the torque output from the reduction gear to the second link; a transmission shaft that transmits reaction of the torque output from a frame of the reduction gear to the first link; a transmission shaft outer cylinder arranged on the outer circumference of the transmission shaft and connected to the transmission shaft; a reduction gear output shaft outer cylinder arranged in the outer circumference of the reduction gear output shaft and connected to the reduction gear output shaft; and a wire body arranged between the first link and the second link and including at least one of a wire and a pipe. The transmission shaft includes the motor frame as at least a part. The wire body is housed in a housing space formed by a space between the transmission shaft outer cylinder and the transmission shaft, the frame of the reduction gear, or the reduction gear output shaft and a space between the reduction gear output shaft outer cylinder and the reduction gear output shaft, the frame of the reduction gear, or the transmission shaft.

According to this application example, in the structure of the joint driving device that turns the first link and the second link with respect to each other, the motor frame is used as a part of the transmission shaft. Therefore, it is possible to simplify the structure and reduce the outer diameter of the joint driving device. With this structure, the space for housing the wire body is provided in the outer circumference of the reduction gear output shaft, the frame of the reduction gear, or the transmission shaft to secure a bending radius of the wire body large. Consequently, it is possible to reduce deformation stress acting on the wire body. It is possible to provide the joint driving device that improves the durability of the wire body.

APPLICATION EXAMPLE 2

The joint driving device described in the application example 1 further includes a reduction gear output shaft collar connected to the reduction gear output shaft and arranged in the outer circumference of the frame of the reduction gear or the transmission shaft.

According to this application example, in an area where the reduction gear output shaft turns, the wire body moves following the reduction gear output shaft outer cylinder and, on the other hand, the frame of the reduction gear and the transmission shaft turn in a direction opposite to the turn of the reduction gear output shaft outer cylinder. Therefore, relative motions of the frame of the reduction gear and the transmission shaft and the wire body occur and friction tends to occur. However, the reduction gear output shaft collar prevents the wire body from coming into contact with the frame of the reduction gear and the transmission shaft and prevents the occurrence of friction with the wire body. Therefore, the durability of the wire body is improved.

APPLICATION EXAMPLE 3

In the joint driving device described in the application example 1, the wire body includes a movable section and fixed sections located at both ends of the movable section. One of the fixed sections of the wire body is arranged along the circumferential direction of the transmission shaft between the transmission shaft outer cylinder and the transmission shaft. The other of the fixed sections of the wire body is arranged along the circumferential direction of the reduction gear output shaft between the reduction gear output shaft outer cylinder and the frame of the reduction gear or the transmission shaft. The movable section of the wire body is arranged to be folded back in a U shape in the circumferential direction of the transmission shaft and the reduction gear output shaft.

According to this application example, when the first link and the second link turn with respect to each other, the U-shaped folded-back section moves. Consequently, it is possible to disperse bending stress acting on the wire body to the entire wire body. It is possible to secure the durability of the wire body.

APPLICATION EXAMPLE 4

In the joint driving device described in the application example 3, one of the fixed sections of the wire body is fixed to be closer to the transmission shaft side and the other of the fixed sections of the wire body is fixed to be closer to the reduction gear output shaft outer cylinder side.

According to this application example, fixing positions of the fixed sections of the wire body are arranged to be shifted in the radial direction of the transmission shaft. Therefore, it is possible to reduce contact pressures of the wire body and the frame of the reduction gear, the reduction gear output shaft, the reduction gear output shaft outer cylinder, the transmission shaft, and the transmission shaft outer cylinder and prevent friction. Therefore, it is possible to improve the durability of the wire body.

APPLICATION EXAMPLE 5

In the joint driving device described in the application example 1, the wire body includes a first wire body and a second wire body. Fixed sections of the first wire body and the second wire body are arranged to be opposed to each other. The wire bodies are arranged in a range in which U-shaped folded-back sections of the wire bodies do not overlap.

According to this application example, the thickness of the wire bodies can be reduced by providing the wire bodies in two systems, increasing the numbers of wires and pipes to a double, and dividing the wires and the pipes into two systems. Therefore, it is possible to reduce housing spaces for the wires and the pipes and configure compact joints.

Application Example 6

In the joint driving device described in the application example 1, a plurality of systems of the wire bodies are arranged along the circumferential direction of the transmission shaft and the reduction gear output shaft.

According to this application example, the numbers of the wires and the pipes can be increased by arranging the plurality of systems of the wire bodies. Therefore, it is possible to house necessary wire bodies.

APPLICATION EXAMPLE 7

In the joint driving device described in the application example 1, a plurality of systems of the wire bodies are arranged along the radial direction of the transmission shaft and the reduction gear output shaft.

According to this application example, the numbers of the wires and the pipes can be increased by arranging the plurality of systems of the wire bodies. Therefore, it is possible to house necessary wire bodies.

APPLICATION EXAMPLE 8

In the joint driving device described in the application example 1, a plurality of systems of the wire bodies are arranged along the axial direction of the transmission shaft and the reduction gear output shaft.

According to this application example, the numbers of the wires and the pipes can be increased by arranging the plurality of systems of the wire bodies. Therefore, it is possible to house necessary wire bodies.

APPLICATION EXAMPLE 9

The joint driving device described in the application example 1 further includes a mechanical brake. The mechanical brake is arranged in a space on the inside of the first link or the second link.

According to this application example, the mechanical brake can be arranged using the space on the inside of the first link or the second link. Therefore, it is possible to reduce the width in a turning axis direction of the joint driving device. It is possible to reduce the joint driving device in size.

APPLICATION EXAMPLE 10

The joint driving device described in the application example 1 further includes a position detector. The position detector is arranged in a space on the inside of the first link or the second link.

According to this application example, the position detector can be arranged using the space on the inside of the first link or the second link. Therefore, it is possible to reduce the width in the turning axis direction of the joint driving device. It is possible to reduce the joint driving device in size.

APPLICATION EXAMPLE 11

The joint driving device described in the application example 1 further includes a motor driving circuit and a position detector processing circuit. The motor driving circuit and the position detector processing circuit are arranged in the first link or the second link.

According to this application example, the motor and the motor driving circuit can be arranged close to each other and the position detector and the position detector processing circuit can be arranged closed to each other. Therefore, it is possible to reduce a wire between the motor and the motor driving circuit and a wire between the position detector and the position detector processing circuit. It is possible to reduce the joint driving device in size.

APPLICATION EXAMPLE 12

In the joint driving device described in the application example 1, the stator of the motor is shrunk-fit or pressed-fit in the motor frame.

According to this application example, by shrink-fitting or press-fitting the stator, it is possible to reduce components for fixing the stator to the motor frame, reduce the joint driving device in size, and reduce costs.

APPLICATION EXAMPLE 13

In the joint driving device described in the application example 1, the wire body is connected to a circuit board or a connector in the housing space or the reduction gear output shaft outer cylinder and the transmission shaft outer cylinder.

According to this application example, the wire body can be relayed or divided in the housing space or the reduction gear output shaft outer cylinder and the transmission shaft outer cylinder. Therefore, workability of assembly and disassembly is improved.

APPLICATION EXAMPLE 14

A robot according to this application example includes the joint driving device described in any one of the above application examples.

According to this application example, in a vertical multi-joint type robot or a scalar type robot in which an arm is configured by sequentially connecting links with turning joints, it is possible to house the wire body in the arm, reduce deformation of bending and twisting of the wire body, prevent breaking of wire and breakage, and extend the life of the robot. Since the wire body can be compactly housed in a joint, it is possible to configure a robot arm that is small in size and light in weight and has a wide movable range. Further, since the wire body can be wound around a shaft and arranged after a machine body is assembled, it is possible to realize a robot that is easily assembled and in which the wire body is easily added and replaced. Further, since it is easy to house the wire body in the arm and form a waterproof and dustproof structure, it is possible to realize a robot of waterproof and dustproof specifications. Consequently, it is possible to provide a small, light, and low-cost robot.

APPLICATION EXAMPLE 15

In the robot described in the application example 14, the second link of the joint driving device turns in a direction in which the joint is bent with respect to the first link.

According to this application example, since the width of the joint that connects the links can be reduced, it is possible to realize a slim arm. Further, since a wide joint operation range can be secured, it is possible to widen a movable range of the robot arm.

APPLICATION EXAMPLE 16

In the robot described in the application example 14, the second link of the joint driving device turns in a direction in which the joint is twisted with respect to the first link.

According to this application example, since the outer diameter of the robot arm can be reduced, it is possible to suppress interference between the links and widen a movable range of the robot arm.

BRIEF DESCRIPTION OF THE DRAWINGS

The invention will be described with reference to the accompanying drawings, wherein like numbers reference like elements.

DESCRIPTION OF EXEMPLARY EMBODIMENTS

A joint driving device and a robot according to the invention are explained in detail below on the basis of preferred embodiments shown in the accompanying drawings.

First Embodiment

Figure 1:
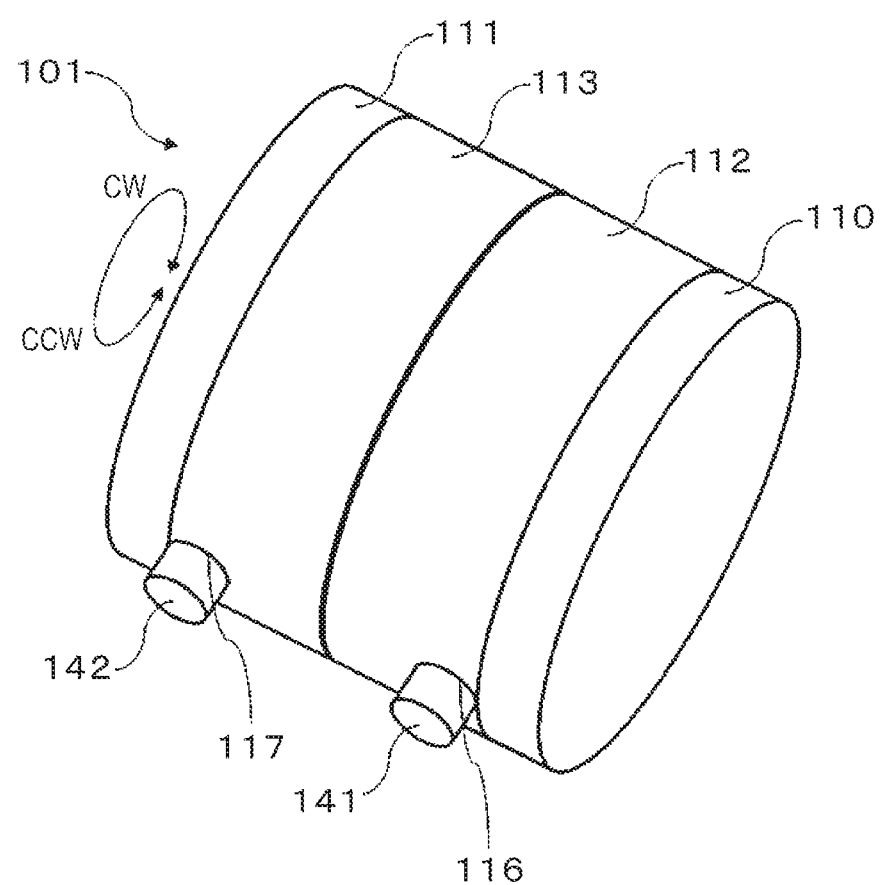
FIG. 1 is a perspective view showing the external shape of an actuator according to a first embodiment.
Figure 2A:
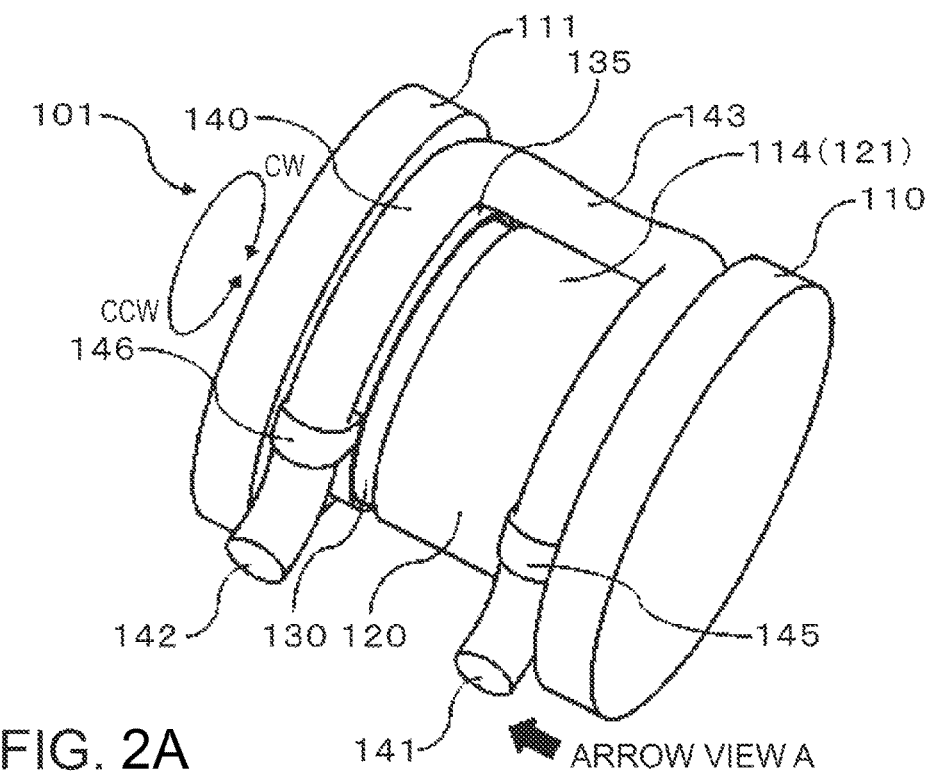
FIGS. 2A and 2B are a perspective view and a sectional view showing an inside in a state in which a cylindrical outer cylinder is removed in the actuator according to the first embodiment.
Figure 2B:
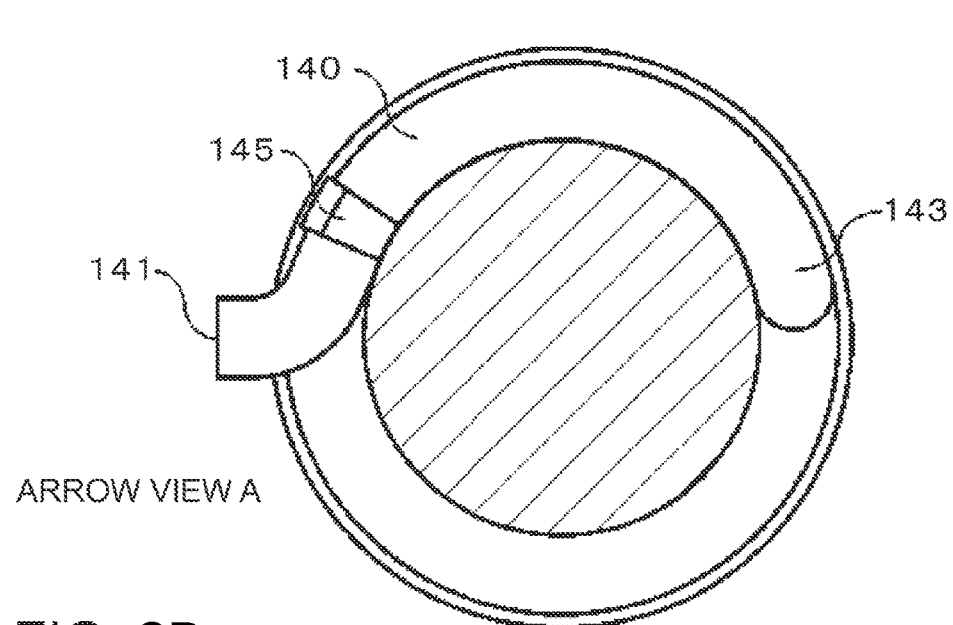

FIG. 1 is a perspective view showing an external shape of an actuator 101 according to this embodiment. FIGS. 2A and 2B are a perspective view and a sectional view showing an inside in a state in which a cylindrical outer cylinder is removed in the actuator 101 according to this embodiment.

The actuator 101 according to this embodiment is explained below with reference to the figures. However, differences from the embodiment explained above are mainly explained. Explanation of similarities is omitted.

In the actuator 101 according to this embodiment, as shown in FIG. 1, a base point link (a first link) 110 and a turning link (a second link) 111 are turnably arranged. A transmission shaft outer cylinder 112 and a reduction gear output axis outer cylinder 113 are arranged between the base point link 110 and the turning link 111. In the transmission shaft outer cylinder 112, a base point link wire body extraction port 116 is provided and a base point link fixed wire body 141 is arranged. In the reduction gear output axis outer cylinder 113, a turning link wire body extraction port 117 is provided and a turning link fixed wire body 142 is arranged.

As shown in FIGS. 2A and 2B, in the actuator 101, a motor 120, a reduction gear 130, a reduction gear output shaft collar 135, and a wire body 140 are arranged between the base point link 110 and the turning link 111.

The wire body 140 is housed in a space surrounded by the transmission shaft outer cylinder 112, the reduction gear output shaft outer cylinder 113, a transmission shaft 114, the reduction gear 130, the reduction gear output shaft collar 135, the base point link 110, and the turning link 111. The wire body 140 is at least one of a wire and a pipe. Note that the wire body 140 is a general term of a power line, a signal line, a gas pipe for supplying gas, a liquid pipe for supplying liquid, and the like. Note that the gas pipe also includes a vacuum pipe.

The wire body 140 is fixed to the base point link 110 by a base point link wire body clamp 145 and fixed to the turning link 111 by a turning link wire body clamp 146. The wire body 140 includes a wire body movable section 143 held by the base point link wire body clamp 145 and the turning link wire body clamp 146, the base point link fixed wire body 141 fixed to the base point link 110, and the turning link fixed wire body 142 fixed to the turning link 111.

The base point link wire body clamp 145 may fix the wire body 140 to be closer to the transmission shaft 114 side. The turning link wire body clamp 146 may fix the wire body 140 to be closer to the reduction gear output shaft outer cylinder 113. By fixing the wire body 140 in this way, it is possible to reduce contact of the wire body 140 with the inner circumference of the transmission shaft outer cylinder 112 and the transmission shaft 114 and improve the durability of the wire body 140.

The wire body 140 is arranged along the outer circumferences of the transmission shaft 114, a reduction gear frame 131, the reduction gear output shaft collar 135, and the reduction gear 130, the inner circumference of the transmission shaft outer cylinder 112, and the inner circumference of the reduction gear output shaft outer cylinder 113. The wire body movable section 143 is arranged to be folded back in a U shape along the circumferential direction of the transmission shaft 114 and a reduction gear output shaft 133 (see FIG. 3).

When the turning link 111 turns with respect to the base point link 110, the position of a U-shape bent section of the wire body movable section 143 moves. Consequently, stress acting on the wire body 140 is reduced. In this case, the wire body 140 involves only bending deformation and does not involve torsional deformation. The entire wire body movable section 143 absorbs stress acting on the wire body 140 according to the movement of the U-shape section. Therefore, the stress acting on the wire body 140 is small. It is possible to improve the durability of the wire body 140.

Figure 3:
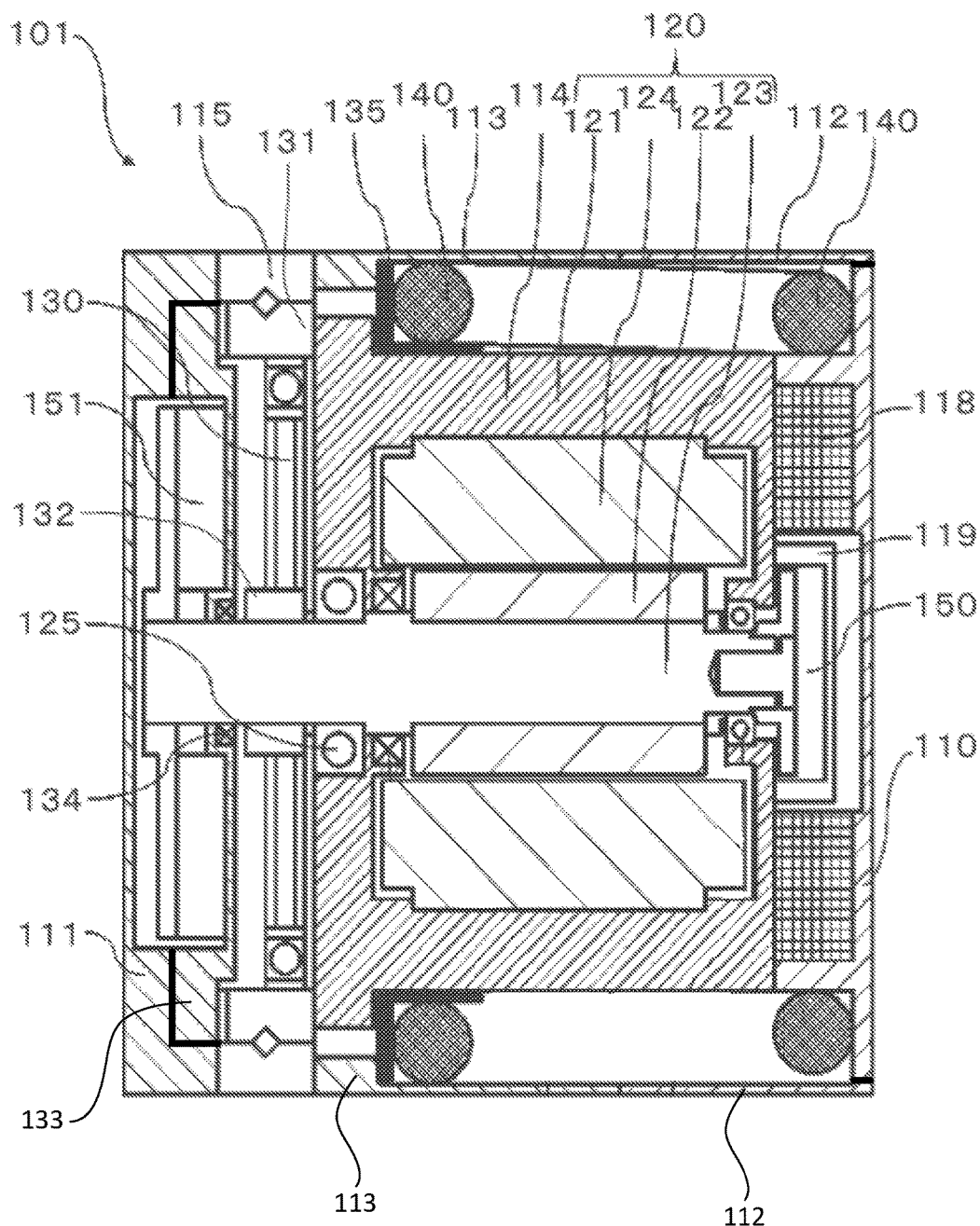
FIG. 3 is a sectional view showing an internal structure of the actuator according to the first embodiment.

FIG. 3 is a sectional view showing an internal structure of an actuator 101 according to this embodiment. The actuator 101 includes, as shown in FIG. 3, the motor 120, the reduction gear 130, the reduction gear output shaft collar 135, the reduction gear output shaft 133, the transmission shaft 114 including a motor frame 121 of the motor 120 as at least a part, the transmission shaft outer cylinder 112, the reduction gear output shaft outer cylinder 113, a position detector 150, a mechanical brake 151, a joint supporting bearing 115, a rotor shaft supporting main bearing 125, a rotor shaft supporting driven bearing 126, a motor oil seal 127, a reduction gear oil seal 134, a motor driving circuit 118, and a position detector processing circuit 119.

The motor 120 includes the motor frame 121, a rotor 122, a rotor shaft 123, a stator 124, the rotor shaft supporting main bearing 125, the rotor shaft supporting driven bearing 126, and the motor oil seal 127. The rotor shaft 123 is supported by the rotor shaft supporting main bearing 125 and the rotor shaft supporting driven bearing 126 and connected to a reduction gear input shaft 132 on the inside of the reduction gear 130. The motor oil seal 127 prevents grease or lubricant for lubricating the inside of the reduction gear 130 from intruding into between the rotor 122 and the stator 124.

The reduction gear 130 includes the reduction gear frame 131, the reduction gear input shaft 132, the reduction gear output shaft 133, the reduction gear oil seal 134, the joint supporting bearing 115, and a gear mechanism. The reduction gear frame 131 is connected to the base point link 110 via the motor frame 121 and the transmission shaft 114. The reduction gear output shaft 133 is connected to the turning link 111. The reduction gear input shaft 132 is connected to the rotor shaft 123 of the motor 120 on the inside of the reduction gear 130. The reduction gear 130 increases torque generated by the motor 120 in the gear mechanism, extracts the torque to the reduction gear output shaft 133, and drives the turning link 111.

In this embodiment, a wave gear is used as the gear mechanism of the reduction gear 130. However, other deceleration mechanism may be used.

The reduction gear output shaft collar 135 is connected to the reduction gear output shaft 133 and arranged in the outer circumference of the reduction gear frame 131 or the transmission shaft 114. The reduction gear output shaft collar 135 prevents the wire body 140 from coming into contact with the reduction gear frame 131 or the transmission shaft 114.

The reduction gear oil seal 134 prevents the grease or the lubricant for lubricating the inside of the reduction gear 130 from flowing out to the mechanical brake 151 side.

The transmission shaft 114 also functions as the motor frame 121. On the inside of the transmission shaft 114, the rotor 122, the rotor shaft 123, and the stator 124 configuring the motor 120, the rotor shaft supporting main bearing 125, the rotor shaft supporting driven bearing 126, and the motor oil seal 127 are arranged. One end face of the transmission shaft 114 is connected to the reduction gear frame 131. The other end face is connected to the base point link 110. The transmission shaft 114 transmits reaction of torque for driving the turning link 111 to the base point link 110.

By integrating at least a part of the transmission shaft 114 with the motor frame 121, the length in the radial direction of the actuator 101 can be reduced compared with when the motor frame 121 is arranged separately from the transmission shaft 114. Therefore, the actuator 101 can be reduced in size and weight. Heat generated from the stator 124 during the driving of the motor 120 can be radiated via the transmission shaft 114. Therefore, it is possible to configure the actuator 101 having a high heat radiation property.

The wire body 140 is housed in a space surrounded by the transmission shaft outer cylinder 112 and the motor frame 121 or the transmission shaft 114 and a space surrounded by the reduction gear output shaft outer cylinder 113 and the reduction gear frame 131 or the transmission shaft 114.

The joint supporting bearing 115 supports, with a cantilever structure, the turning link 111 with respect to the base point link 110. In this embodiment, a joint supporting method of the cantilever structure is used. However, a joint supporting method of a twin holding structure may be used.

The position detector 150 may be arranged on the inside of the base point link 110. Consequently, the length between the base point link 110 and the turning link 111 can be reduced and the actuator 101 can be reduced in size. As the position detector 150, a unit structure may be used or a module structure may be used.

The rotor shaft 123 may be connected to an input shaft of the mechanical brake 151 piercing through the center of the reduction gear output shaft 133 and arranged on the inside of the turning link 111. Consequently, the length between the base point link 110 and the turning link 111 can be reduced and the actuator 101 can be reduced in size.

The joint driving device 101 may include the motor driving circuit 118 and the position detector processing circuit 119. The motor driving circuit 118 and the position detector processing circuit 119 may be arranged between the transmission shaft outer cylinder 112 and the transmission shaft 114, between the reduction gear output shaft outer cylinder 113 and the reduction gear frame 131, or the inside of the base point link 110 or the turning link 111. Consequently, the length between the base point link 110 and the turning link 111 can be reduced and the actuator 101 can be reduced in size.

The stator 124 of the motor 120 may be shrunk-fit in or press-inserted into the motor frame 121. Consequently, by shrink-fitting or press-inserting the stator 124, components for fixing the stator 124 to the motor frame 121 can be reduced, the actuator 101 can be reduced in size, and costs can be reduced.

Since FIG. 3 is a schematic diagram, a sectional view is omitted. Scales are set to clearly show the figure. The wire body 140 is a single wire body or is formed by binding a plurality of wire bodies. The wire body 140 is bendable. The wire body 140 can bend following motions of the base point link 110 and the turning link 111 that turn with respect to each other.

The operation of the actuator 101 in this embodiment configured as explained above is explained.

When the motor 120 is driven, the turning link 111 connected to the reduction gear output shaft 133 turns with respect to the base point link 110 connected to the transmission shaft 114. The U-shaped wire body movable section 143 moves in a space surrounded by the reduction gear output shaft 133 and the reduction gear output shaft outer cylinder 113 or the transmission shaft 114 and the transmission shaft outer cylinder 112, whereby the wire body 140 absorbs an angle change of the base point link 110 and the turning link 111.

When the turning link 111 turns clockwise (CW) with respect to the base point link 110, the wire body 140 moves to be rolled in and moves while winding around the reduction gear output shaft collar 135. Conversely, when the turning link 111 turns counterclockwise (CCW), the wire body 140 moves to be pushed out and moves along the reduction gear output shaft outer cylinder 113 and the transmission shaft outer cylinder 112. In this operation, only bending deformation acts on the wire body 140. The U-shaped bent section moves on the wire body 140 according to the turn of the link. Therefore, it is possible to absorb the stress of the bending deformation with the entire wire body 140 and improve the durability of the wire body 140.

According to this embodiment, the rotor shaft 123 has a solid structure. Compared with a shaft having a hollow structure, the rotor shaft 123 has small inertia and can accelerate and decelerate at high speed. Compared with the shaft having the hollow structure, the rotor shaft 123 having the solid structure has a small outer diameter. Relative speed of the contact section with the oil seal is low. Therefore, the rotor shaft 123 has small heat generation and can turn at high speed.

FIGS. 4A to 4E are schematic diagrams showing the movement of the wire body 140 of the actuator 101 according to this embodiment. In other words, FIGS. 4A to 4E are schematic diagrams showing deformation of the wire body 140 involved in the turn of the link according to this embodiment. A relation between the turn of the turning link 111 with respect to the base point link 110 and the movement of the U-shaped bent section of the wire body movable section 143 is explained with reference to the figures.

Figure 4A:
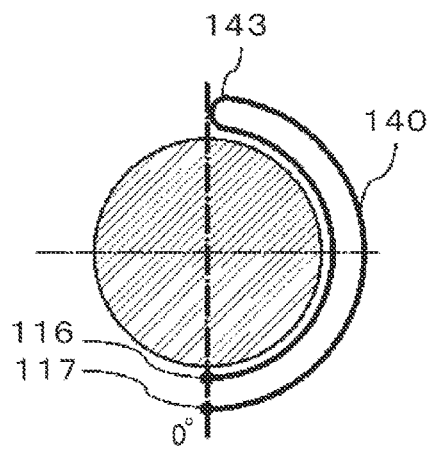
FIGS. 4A to 4E are schematic diagrams showing movements of a wire body of the actuator according to the first embodiment.

FIG. 4A shows a reference position where the base point link wire body extraction port 116 and the turning link wire body extraction port 117 are in the same circumferential direction of the actuator 101. An angle formed by the base point link 110 and the turning link 111 is 0 degree.

Figure 4B:
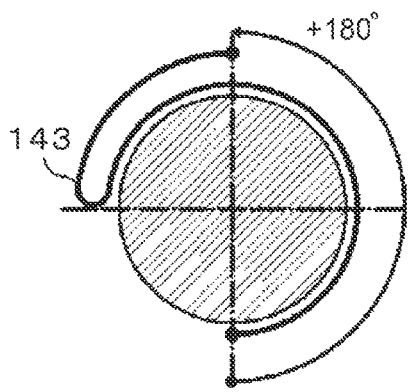

FIG. 4B shows deformation of the wire body 140 at the time when the turning link 111 turns +180 degrees with respect to the base point link 110. The position of the U-shaped bent section of the wire body movable section 143 moves at a half angle with respect to the turning angle of the turning link 111 because the wire body 140 is folded back in the U shape. In this case, the U-shaped bent section moves to a position of 270 degrees (=initial position 180+moving amount 180/2).

Figure 4D:
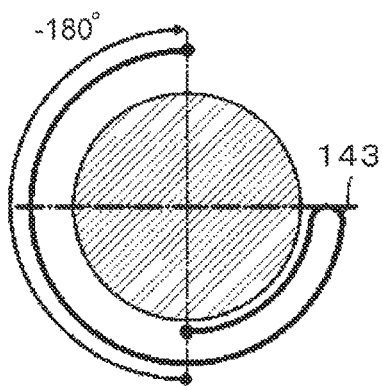
Figure 4C:
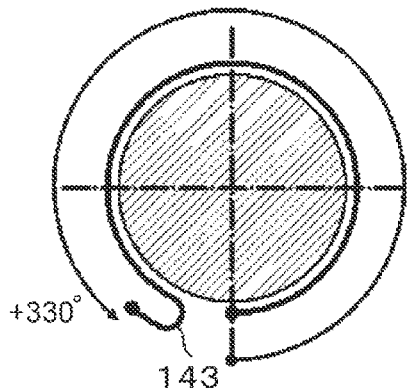

FIG. 4C shows deformation of the wire body 140 at the time when the turning link 111 turns +330 degrees with respect to the base point link 110. In this case, the U-shaped bent section moves to a position of 345 degrees (=initial position 180+moving amount 330/2).

FIG. 4D shows deformation of the wire body 140 at the time when the turning link 111 turns −180 degrees with respect to the base point link 110. In this case, the U-shaped bent section moves to a position of 90 degrees (=initial position 180−moving amount 180/2).

Figure 4E:
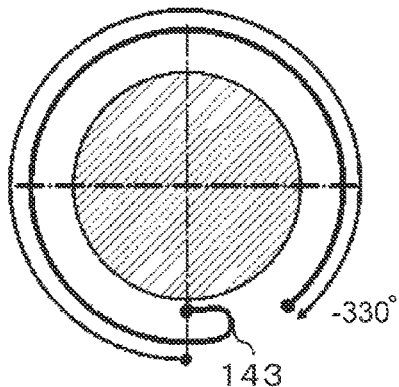

FIG. 4E shows deformation of the wire body 140 at the time when the turning link 111 turns +330 degrees with respect to the base point link 110. In this case, the U-shaped bent section moves to a position of 15 degrees (=initial position 180−moving amount 330/2).

An angle range in which the turning link 111 can turn with respect to the base point link 110 is a range in which the U-shaped bent section does not climb over the base point link fixed section in the plus direction and a range in which the U-shaped bent section does not climb over the turning link fixed section in the minus direction. According to this condition, ideally, the turning link 111 can turn ±360 degrees with respect to the base point link 110.

Next, an implementation mode of the robot including the actuator according to this embodiment is exemplified. FIGS. 12, 13, and 14 are schematic diagrams showing the robot arm of the robot according to this embodiment.

Figure 5:
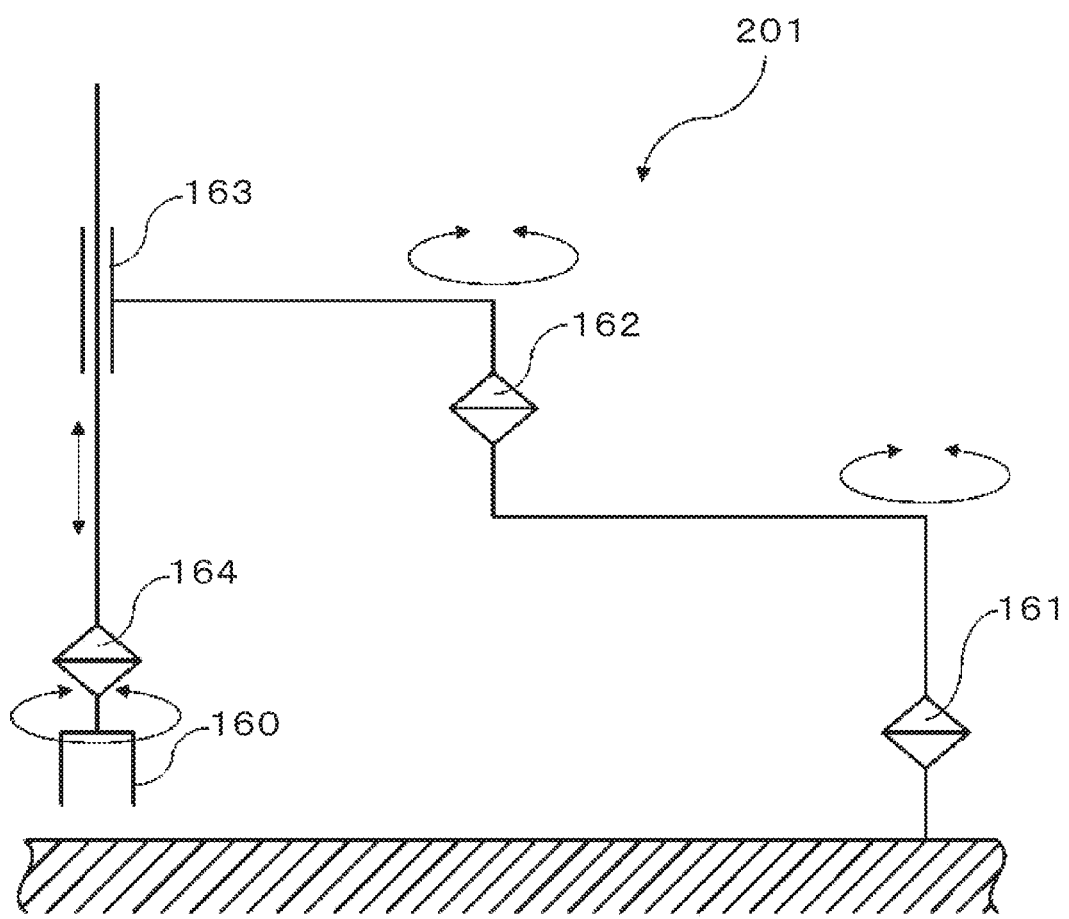
FIG. 5 is a schematic diagram showing the configuration of a scalar type robot according to the first embodiment.

FIG. 5 is a schematic diagram showing the configuration of a scalar type robot 201 according to this embodiment. In other words, FIG. 5 is a schematic diagram of the scalar type robot 201 applied with the invention.

A J1 axis actuator 161, a J2 axis actuator 162, a J3 axis actuator 163, a J4 axis actuator 164, and an end effector 160 are sequentially arranged from a manipulator main body. The invention can be applied to the J1 axis actuator 161, the J2 axis actuator 162, and the J4 axis actuator 164 configured by turning joints. The J1 axis actuator 161, the J2 axis actuator 162, and the J4 axis actuator 164 are arranged in directions in which the joints are bent.

According to this embodiment, the width and the height of the joints configuring the scalar type robot 201 can be reduced. Therefore, it is possible to realize the slim scalar type robot 201.

Figure 6:
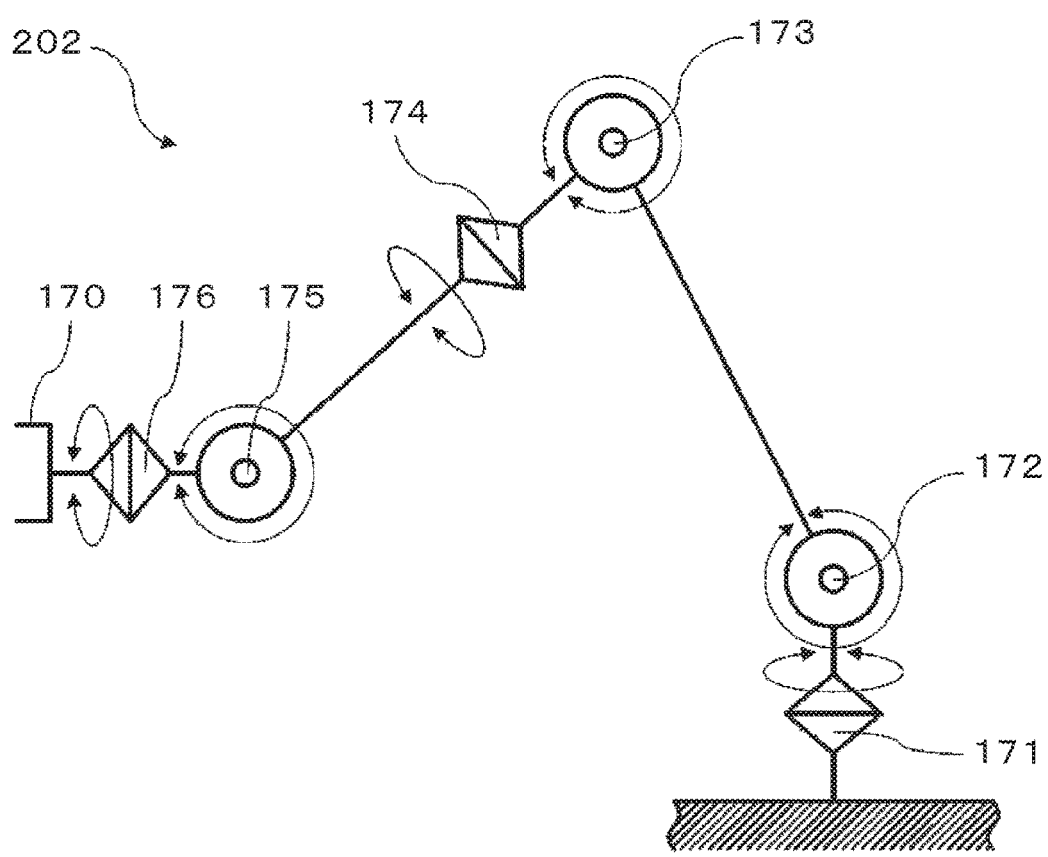
FIG. 6 is a schematic diagram showing the configuration of a six-axis vertical multi-joint type robot according to the first embodiment.

FIG. 6 is a schematic diagram showing the configuration of a six-axis vertical multi-joint type robot 202 according to this embodiment. In other words, FIG. 6 is a schematic diagram of the six-axis vertical multi-joint type robot 202 applied with the invention.

A J1 axis actuator 171, a J2 axis actuator 172, a J3 axis actuator 173, a J4 axis actuator 174, a J5 axis actuator 175, a J6 axis actuator 176, and an end effector 170 are sequentially arranged from a manipulator main body. The J1 axis actuator 171, the J4 axis actuator 174, and the J6 axis actuator 176 are arranged in directions in which joints are twisted. The J2 axis actuator 172, the J3 axis actuator 173, and the J5 axis actuator 175 are arranged in directions in which the joints are bent.

According to this embodiment, the diameter of the joints to be twisted can be reduced. Therefore, it is possible to configure the slim six-axis vertical multi-joint type robot 202. Further, the diameter and the width of the joints to be bent can be reduced. Therefore, it is possible to configure the six-axis vertical multi-joint type robot 202 that prevents interference between links and has a wide operation range.

Figure 7:
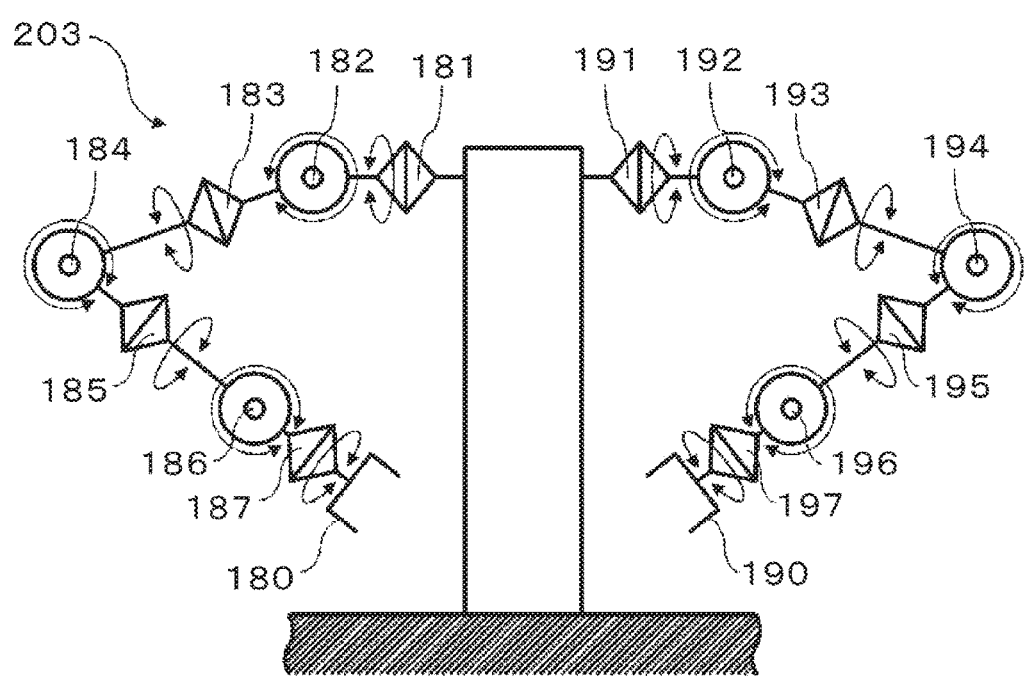
FIG. 7 is a schematic diagram showing the configuration of a double-arm seven-axis robot according to the first embodiment.

FIG. 7 is a schematic diagram showing the configuration of a double-arm seven-axis vertical multi-joint type robot 203 according to this embodiment. In other words, FIG. 7 is a schematic diagram of the double-arm seven-axis vertical multi-joint type robot 203 applied with the invention.

In a right arm, a J1 axis actuator 181, a J2 axis actuator 182, a J3 axis actuator 183, a J4 axis actuator 184, a J5 axis actuator 185, a J6 axis actuator 186, a J7 axis actuator 187, and an end effector 180 are sequentially arranged from a manipulator main body. In a left arm, a J1 axis actuator 191, a J2 axis actuator 192, a J3 axis actuator 193, a J4 axis actuator 194, a J5 axis actuator 195, a J6 axis actuator 196, a J7 axis actuator 197, and an end effector 190 are sequentially arranged from the manipulator main body. The J1 axis actuators 181 and 191, the J3 axis actuators 183 and 193, the J5 axis actuators 185 and 195, and the J7 axis actuators 187 and 197 are arranged in directions in which joints are twisted. The J2 axis actuators 182 and 192, the J4 axis actuators 184 and 194, and the J6 axis actuators 186 and 196 are arranged in directions in which the joints are bent.

According to this embodiment, the diameter of the joints to be twisted can be reduced. Therefore, it is possible to configure the slim double-arm seven-axis vertical multi-joint type robot 203. Further, the diameter and the width of the joints to be bent can be reduced. Therefore, it is possible to configure the double-arm seven-axis vertical multi-joint type robot 203 that prevents interference between links and has a wide operation range.

Embodiments concerning an arrangement method for wire bodies are explained.

Second Embodiment

Figure 8A:
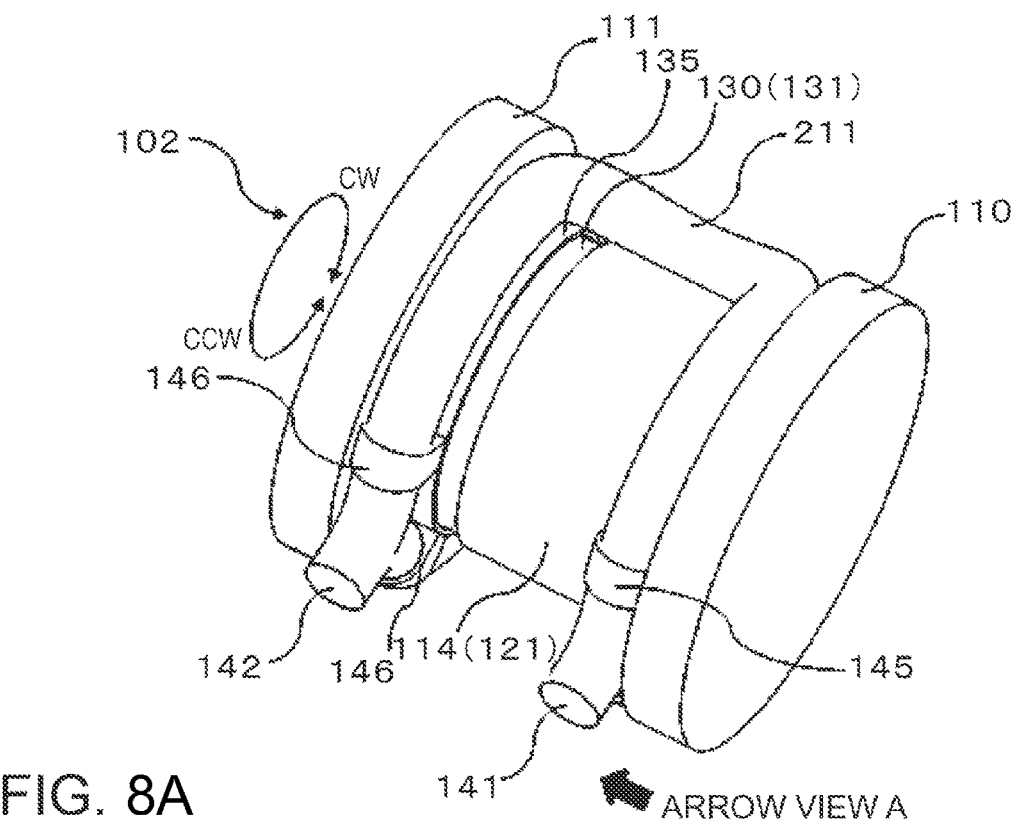
FIGS. 8A and 8B are a perspective view and a sectional view showing an inside in a state in which a cylindrical outer cylinder is removed in an actuator in which wire bodies are arranged to be opposed to each other according to a second embodiment.
Figure 8B:
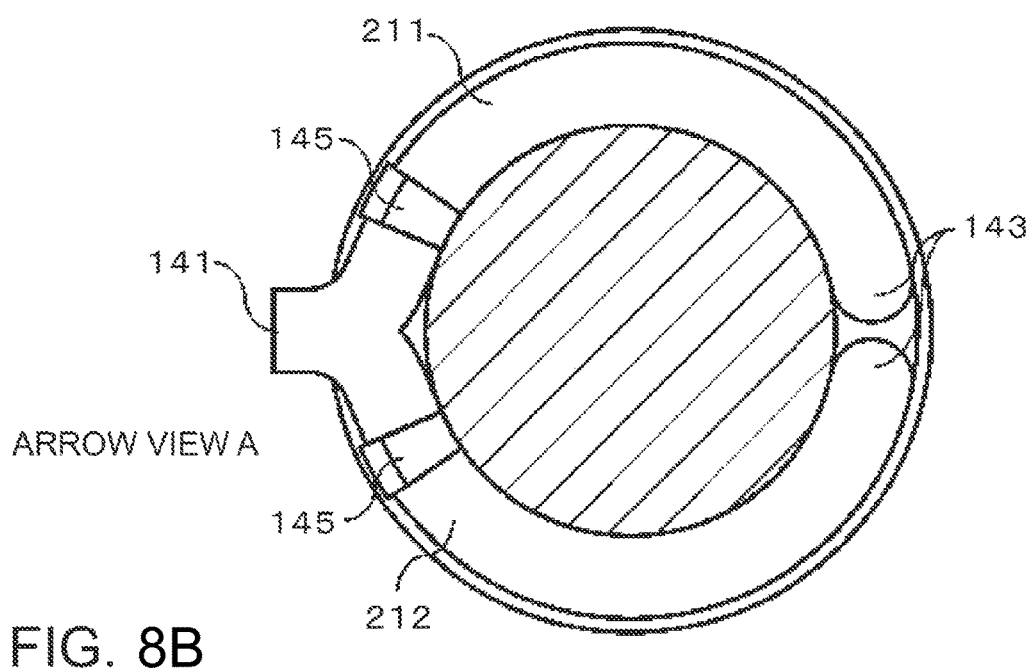

FIGS. 8A and 8B are a perspective view and a sectional view showing an inside in a state in which a cylindrical outer cylinder is removed in an actuator 102 in which wire bodies are arranged to be opposed to each other according to this embodiment.

The actuator 102 according to this embodiment includes, as shown in FIGS. 8A and 8B, a first wire body 211 and a second wire body 212. Fixed sections of the first wire body 211 and the second wire body 212 are arranged to be opposed to each other. Wire body movable sections 143 of the first wire body 211 and the second wire body 212 are arranged to be folded back. As shown in FIG. 15B, the first wire body 211 and the second wire body 212 are arranged in a range in which U-shaped sections do not overlap a region where the outer circumferences of the transmission shaft 114, the reduction gear frame 131, and the reduction gear output shaft 133 are divided into two.

According to this embodiment, the thickness of the wire bodies can be reduced by providing the wire bodies in two systems, increasing the numbers of wires and pipes to a double, and dividing the wires and the pipes into two systems. Therefore, it is possible to reduce spaces for the wires and the pipes and configure compact joints.

FIGS. 9A to 9E are schematic diagrams showing motions of the wire bodies of the actuator 102 according to this embodiment. In other words, FIGS. 9A to 9E are schematic diagrams showing deformation of the first wire body 211 and the second wire body 212 involved in the turn of the turning link 111 with respect to the base point link 110 according to this embodiment. A relation between the turn of the turning link 111 with respect to the base point link 110 and the movement of the U-shaped bent sections of the first wire body 211 and the second wire body 212 is explained with reference to the figures.

Figure 9A:
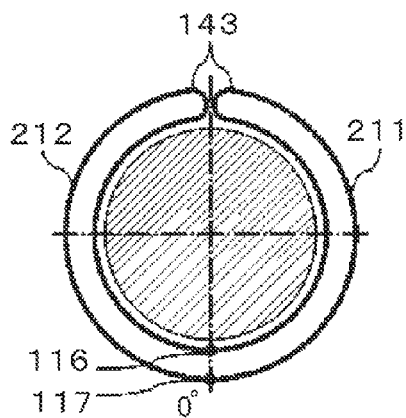
FIGS. 9A to 9E are schematic diagrams showing movements of the wire body of the actuator according to the second embodiment.

FIG. 9A shows a reference position where the base point link wire body extraction port 116 and the turning link wire body extraction port 117 are in the same circumferential direction of the actuator 102. An angle formed by the base point link 110 and the turning link 111 is 0 degree. In this case, the U-shaped section of the first wire body 211 and the U-shaped section of the second wire body 212 are arranged in positions opposed to each other.

Figure 9B:
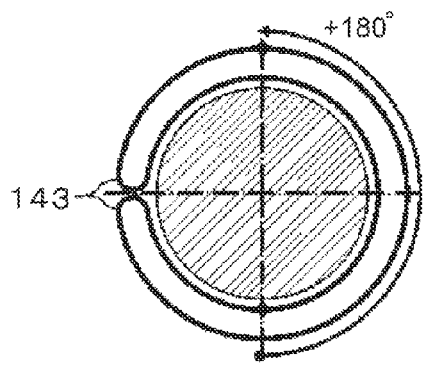

FIG. 9B shows deformation of the first wire body 211 and the second wire body 212 at the time when the turning link 111 turns +180 degrees with respect to the base point link 110. The U-shaped sections of the first wire body 211 and the second wire body 212 move while keeping the opposed positional relation. The position of the U-shaped bent section of the wire body movable section 143 moves at a half angle with respect to the turning angle of the turning link 111 because the wire bodies are folded back in the U shape. In this case, the U-shaped bent sections move to a position of 270 degrees (=initial position 180+moving amount 180/2).

Figure 9D:
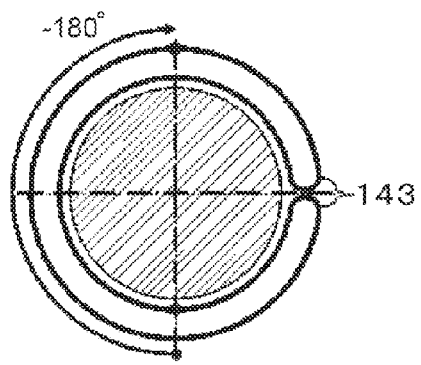
Figure 9C:
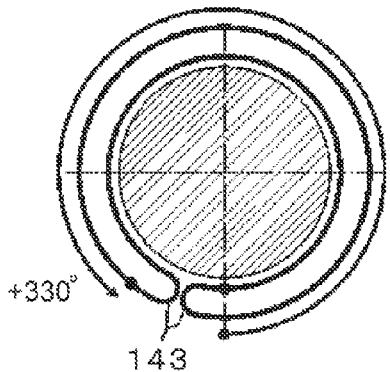

FIG. 9C shows deformation of the first wire body 211 and the second wire body 212 at the time when the turning link 111 turns +330 degrees with respect to the base point link 110. In this case, the U-shaped bent sections move to a position of 345 degrees (=initial position 180+moving amount 330/2).

FIG. 9D shows deformation of the first wire body 211 and the second wire body 212 at the time when the turning link 111 turns −180 degrees with respect to the base point link 110. In this case, the U-shaped bent sections move to a position of 90 degrees (=initial position 180−moving amount 180/2).

Figure 9E:
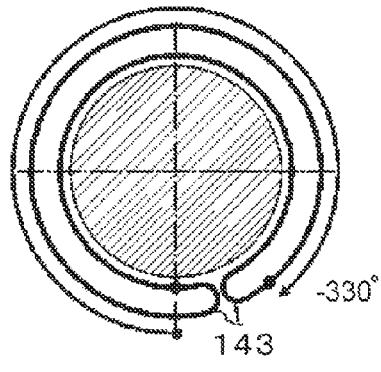

FIG. 9E shows deformation of the first wire body 211 and the second wire body 212 at the time when the turning link 111 turns −330 degrees with respect to the base point link 110. In this case, the U-shaped bent sections move to a position of 15 degrees (=initial position 180−moving amount 330/2).

An angle range in which the turning link 111 can turn with respect to the base point link 110 is a range in which the U-shaped bent sections climb over neither the base point link fixed wire body 141 nor the turning link fixed wire body 142 in both the plus and the minus direction. According to this condition, ideally, the turning link 111 can turns ±360 degrees with respect to the base point link 110.

Third Embodiment

Figure 10A:
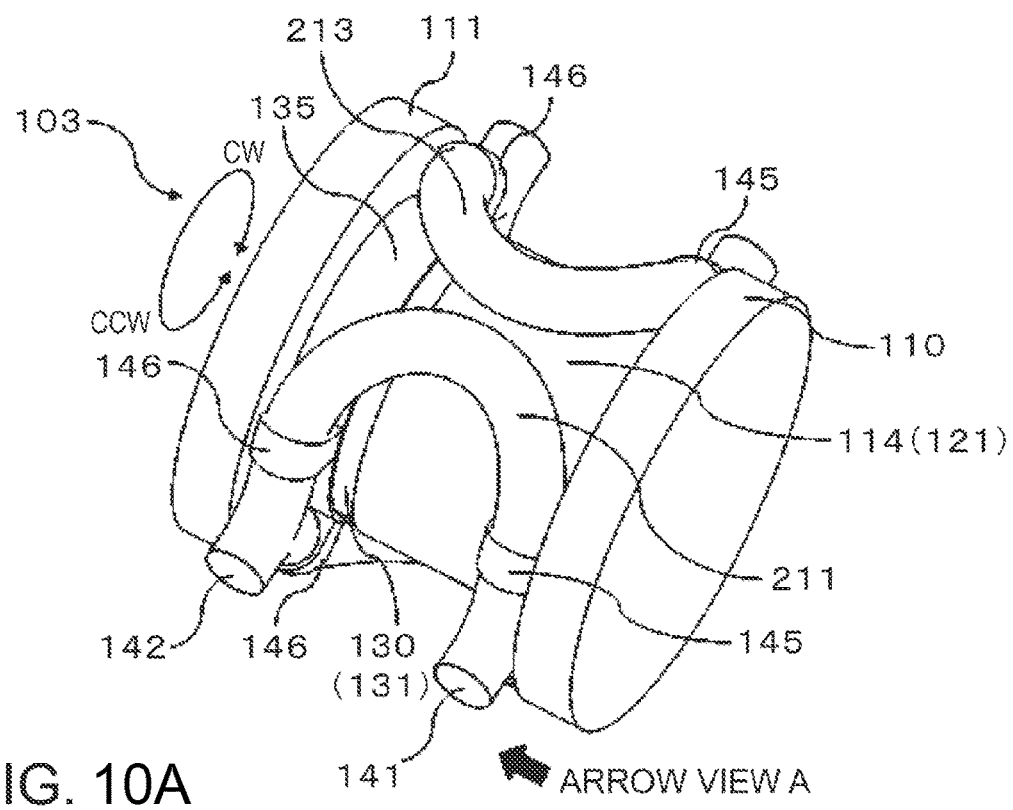
FIGS. 10A and 10B are a perspective view and a sectional view showing an inside in a state in which a cylindrical outer cylinder is removed in an actuator in which a plurality of wire bodies are arranged in the circumferential direction according to a third embodiment.
Figure 10B:
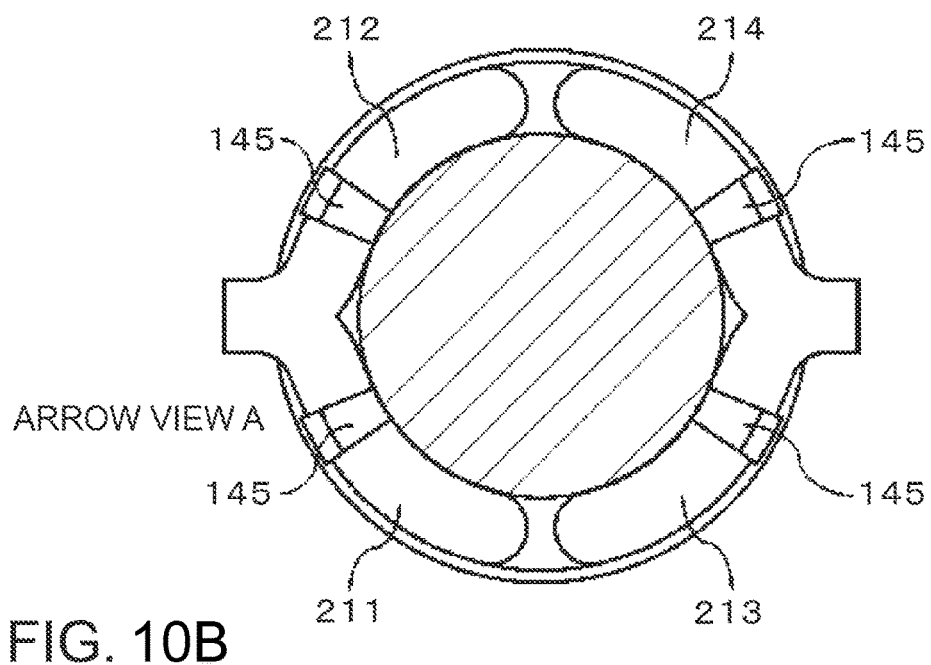

FIGS. 10A and 10B are a perspective view and a sectional view showing an inside in a state in which a cylindrical outer cylinder is removed in an actuator 103 in which a plurality of wire bodies are arranged in the circumferential direction according to this embodiment.

The actuator 103 according to this embodiment includes, as shown in FIGS. 10A and 10B, the first wire body 211, the second wire body 212, a third wire body 213, and a fourth wire body 214. The fixed sections of the first wire body 211 and the second wire body 212 are arranged to be opposed to each other. Fixed sections of the third wire body 213 and the fourth wire body 214 are arranged to be opposed to each other. The wire body movable sections 143 of the wire bodies are folded back in a U shape. The outer circumferences of the transmission shaft 114, the reduction gear frame 131, and the reduction gear output shaft 133 are equally divided into two and arranged. As shown in FIG. 10B, the first wire body 211 and the third wire body 213 and the second wire body 212 and the fourth wire body 214 are arranged in ranges in which the U-shaped sections do not overlap the outer circumferences of the transmission shaft 114, the reduction gear frame 131, and the reduction gear output shaft 133.

According to this embodiment, the thickness of the wire bodies can be reduced by providing the wire bodies in four systems, increasing the numbers of wires and pipes to a quadruple, and dividing the wires and the pipes into four systems. Therefore, it is possible to reduce spaces for the wires and the pipes and configure compact joints. In this embodiment, as a turning range of the turning link 111 with respect to the base point link 110, ideally, ±180 degrees can be secured. Further, the numbers of the wires and the pipes can be increased by equally dividing the outer circumferences of the transmission shaft 114, the reduction gear frame 131, and the reduction gear output shaft 133 into n and arranging the wires and the pipes in n×2 systems. Therefore, it is possible to house necessary wire bodies.

Note that, in this embodiment, the first wire body 211 and the second wire body 212 are arranged to be opposed to each other and the third wire body 213 and the fourth wire body 214 are arranged to be opposed to each other. However, only one of the first wire body 211 and the second wire body 212 and one of the third wire body 213 and the fourth wire body 214 may be arranged.

Fourth Embodiment

Figure 11A:
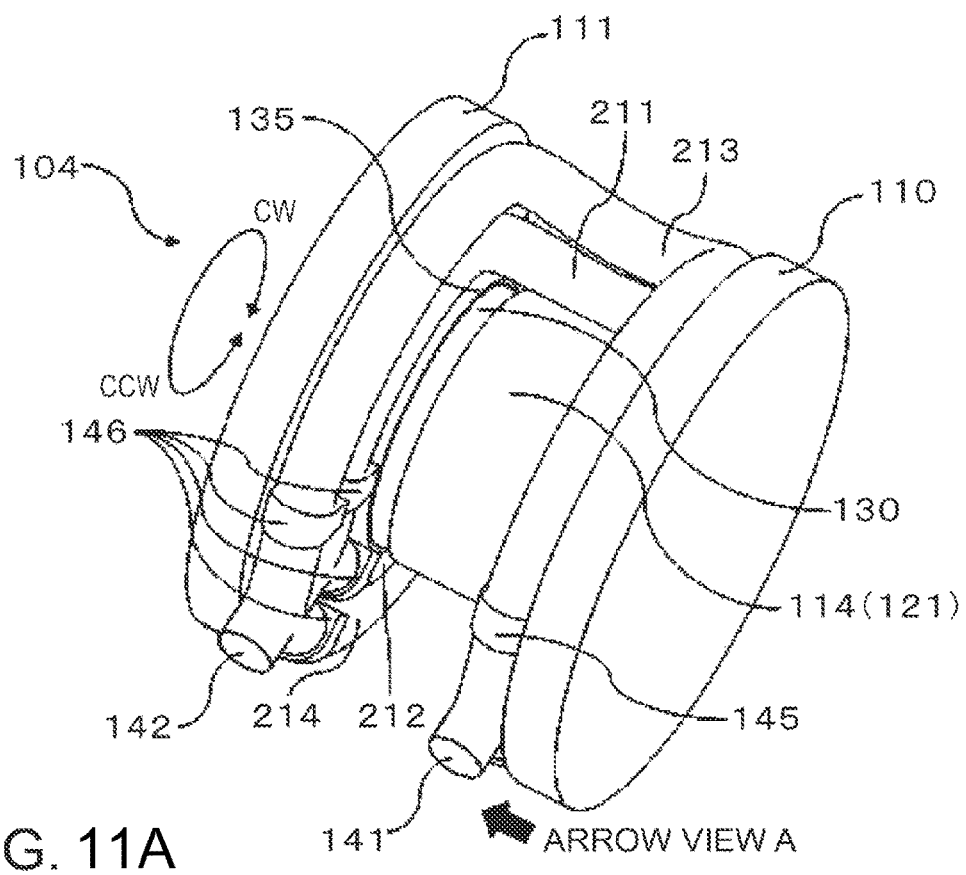
FIGS. 11A and 11B are a perspective view and a sectional view showing an inside in a state in which a cylindrical outer cylinder is removed in an actuator in which a plurality of wire bodies are arranged in the radial direction according to a fourth embodiment.
Figure 11B:
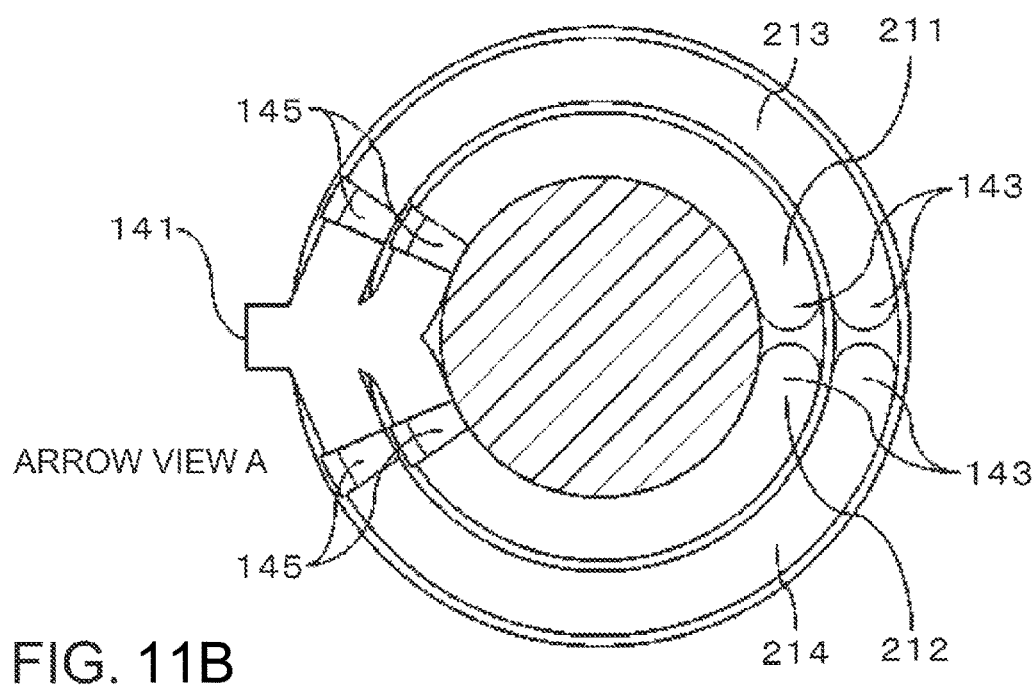

FIGS. 11A and 11B are a perspective view and a sectional view showing an inside in a state in which a cylindrical outer cylinder is removed in an actuator 104 in which a plurality of wire bodies are arranged in the radial direction according to this embodiment.

The actuator 104 according to this embodiment includes, as shown in FIGS. 11A and 11B, the first wire body 211, the second wire body 212, the third wire body 213, and the fourth wire body 214. The fixed sections of the first wire body 211 and the second wire body 212 are arranged to be opposed to each other. The fixed sections of the third wire body 213 and the fourth wire body 214 are arranged to be opposed to each other. The wire body movable sections 143 of the wire bodies are folded back in a U shape. As shown in FIG. 11B, the first wire body 211 and the second wire body 212 are arranged in a range in which the U-shaped sections do not overlap the outer circumferences of the transmission shaft 114, the reduction gear frame 131, and the reduction gear output shaft 133. Further, the third wire body 213 and the fourth wire body 214 are arranged in a range in which the U-shaped portions do not overlap the outer circumferences.

According to this embodiment, the thickness of the wire bodies can be reduced by providing the wire bodies in four systems, increasing the numbers of wires and pipes to a quadruple, and dividing the wires and the pipes into four systems. Therefore, it is possible to reduce spaces for the wires and the pipes and configure compact joints. In this embodiment, as a turning range of the turning link 111 with respect to the base point link 110, ideally, ±180 degrees can be secured. Further, the numbers of the wires and the pipes can be increased by arranging the wires and the pipes in the outer circumference direction of the transmission shaft 114, the reduction gear frame 131, and the reduction gear output shaft 133. Therefore, it is possible to house necessary wire bodies.

Note that, in this embodiment, the first wire body 211 and the second wire body 212 are arranged to be opposed to each other and the third wire body 213 and the fourth wire body 214 are arranged to be opposed to each other. However, only one of the first wire body 211 and the second wire body 212 and one of the third wire body 213 and the fourth wire body 214 may be arranged.

Fifth Embodiment

Figure 12A:
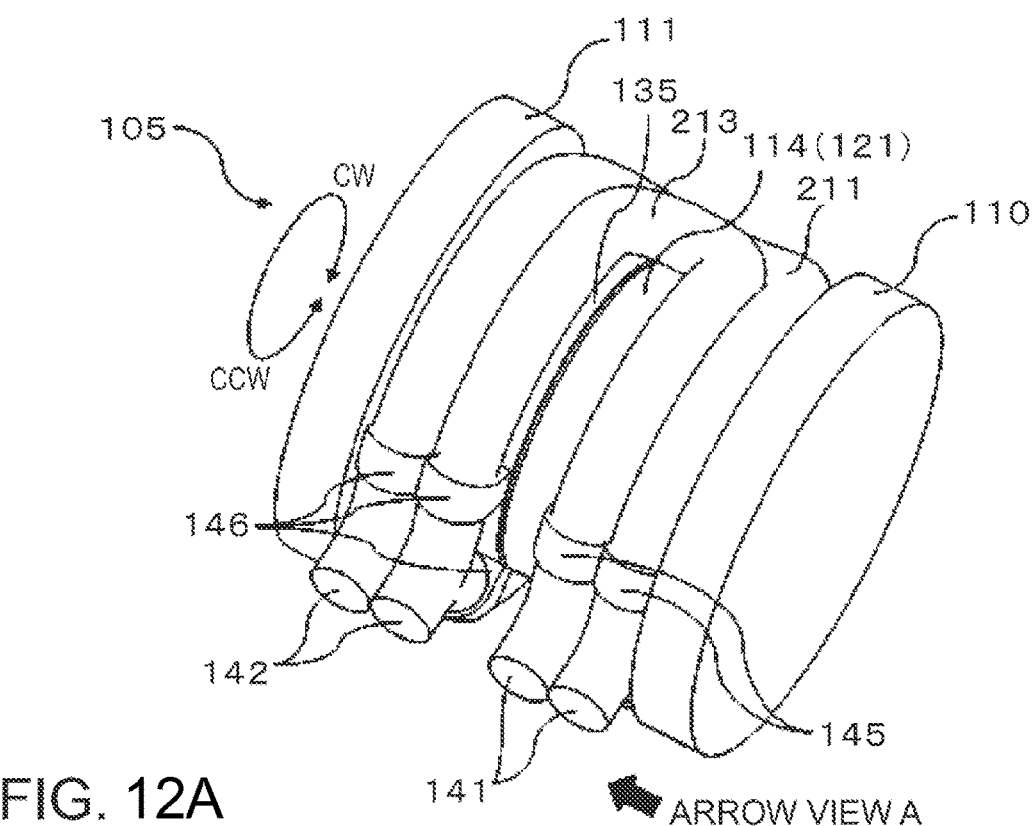
FIGS. 12A and 12B are a perspective view and a sectional view showing an inside in a state in which a cylindrical outer cylinder is removed in an actuator in which a plurality of wire bodies are arranged in the axial direction according to a fifth embodiment.
Figure 12B:
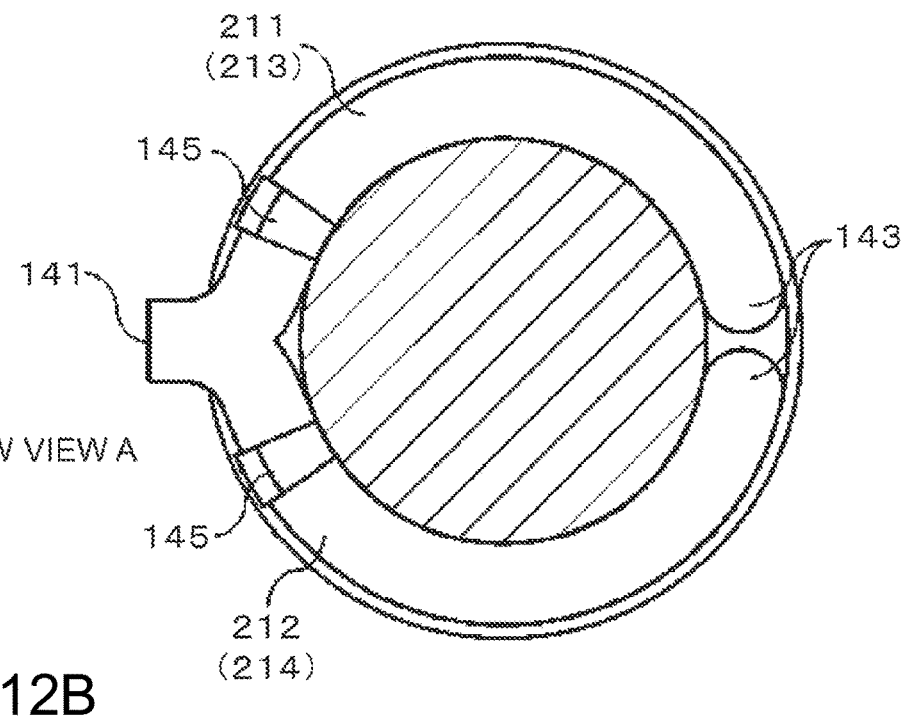

FIGS. 12A and 12B are a perspective view and a sectional view showing an inside in a state in which a cylindrical outer cylinder is removed in an actuator 105 in which a plurality of wire bodies are arranged in the axial direction according to this embodiment.

The actuator 105 according to this embodiment includes, as shown in FIGS. 12A and 12B, the first wire body 211, the second wire body 212, the third wire body 213, and the fourth wire body 214. The fixed sections of the first wire body 211 and the second wire body 212 are arranged to be opposed to each other. The fixed sections of the third wire body 213 and the fourth wire body 214 are arranged to be opposed to each other. The wire body movable sections 143 of the wire bodies are folded back in a U shape. As shown in FIG. 12B, the first wire body 211 and the second wire body 212 are arranged in a range in which the U-shaped sections do not overlap the outer circumferences of the transmission shaft 114, the reduction gear frame 131, and the reduction gear output shaft 133. Further, the third wire body 213 and the fourth wire body 214 are arranged in a range in which the U-shaped portions do not overlap the inner side of the U-shaped folded-back arrangement of the first wire body 211 and the second wire body 212.

According to this embodiment, the thickness of the wire bodies can be reduced by providing the wire bodies in four systems, increasing the numbers of wires and pipes to a quadruple, and dividing the wires and the pipes into four systems. Therefore, it is possible to reduce spaces for the wires and the pipes and configure compact joints. In this embodiment, as a turning range of the turning link 111 with respect to the base point link 110, ideally, ±180 degrees can be secured. Further, the numbers of the wires and the pipes can be increased by arranging the wires and the pipes in the axial direction of the transmission shaft 114, the reduction gear frame 131, and the reduction gear output shaft 133. Therefore, it is possible to house necessary wire bodies.

Note that, in this embodiment, the first wire body 211 and the second wire body 212 are arranged to be opposed to each other and the third wire body 213 and the fourth wire body 214 are arranged to be opposed to each other. However, only one of the first wire body 211 and the second wire body 212 and one of the third wire body 213 and the fourth wire body 214 may be arranged.

The first embodiment to the fifth embodiment can be applied in common to turning sections of machine apparatuses. Besides the joints of the robots 201, 202, and 203, the embodiments can be used for machine apparatuses involving turning motions and incorporating the wire bodies 211, 212, 213, and 214. A turning driving unit incorporating the wire bodies 211, 212, 213, and 214 can be configured by integrating a reduction gear and a motor and applying the embodiments to the reduction gear and the motor.

The joint driving device and the robot being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A joint driving device in which a first link and a second link relatively turn, the joint driving device comprising:
    a motor including a rotor, a rotor shaft, a stator, and a plurality of bearings that support the rotor shaft;
    a reduction gear engaged with the rotation shaft that decelerates rotation from the motor and increases and outputs a torque output of the motor;
    a reduction gear output shaft engaged with the reduction gear and the second link that transmits the torque output from the reduction gear to the second link;
    a transmission shaft that is a motor frame extending longitudinally with the motor and supporting the rotor, rotor shaft, and stator, wherein the transmission shaft is engaged with a frame of the reduction gear and the first link, transmitting a reaction torque output from the frame of the reduction gear to the first link;
    a transmission shaft outer cylinder arranged on the outer circumference of the transmission shaft and connected to the transmission shaft;
    a reduction gear output shaft outer cylinder arranged on the outer circumference of the reduction gear output shaft and connected to the reduction gear output shaft; and
    a wire body arranged between the first link and the second link and including at least one of a wire and a pipe, wherein
    the wire body is housed in a housing space defined by the transmission shaft outer cylinder, the transmission shaft, and the reduction gear output shaft outer cylinder,
    the rotor shaft extends from within the motor to the second link, and
    the reduction gear output shaft is disposed within the second link.

2. The joint driving device according to claim 1, further comprises:
    a reduction gear output shaft collar connected to the reduction gear output shaft and arranged on the outer circumference of the frame of the reduction gear or the transmission shaft.

3. The joint driving device according to claim 1, wherein the wire body includes a movable section and fixed sections located at both ends of the movable section,
    one of the fixed sections of the wire body is arranged along the circumferential direction of the transmission shaft between the transmission shaft outer cylinder and the transmission shaft,
    the other of the fixed sections of the wire body is arranged along the circumferential direction of the reduction gear output shaft between the reduction gear output shaft outer cylinder and the frame of the reduction gear or the transmission shaft, and
    the movable section of the wire body is arranged to be folded back in a U shape in the circumferential direction of the transmission shaft and the reduction gear output shaft.

4. The joint driving device according to claim 3, wherein the one of the fixed sections of the wire body is fixed to be closer to the transmission shaft side, and
    the other of the fixed sections of the wire body is fixed to be closer to the reduction gear output shaft outer cylinder side.

5. The joint driving device according to claim 1, wherein the wire body includes a first wire body and a second wire body,
    fixed sections of the first wire body and the second wire body are arranged to be opposed to each other, and
    the wire bodies are arranged in a range in which U-shaped folded-back sections of the wire bodies do not overlap.

6. The joint driving device according to claim 1, wherein a plurality of systems of the wire bodies are arranged along the circumferential direction of the transmission shaft and the reduction gear output shaft.

7. The joint driving device according to claim 1, wherein a plurality of systems of the wire bodies are arranged along the radial direction of the transmission shaft and the reduction gear output shaft.

8. The joint driving device according to claim 1, wherein a plurality of systems of the wire bodies are arranged along the axial direction of the transmission shaft and the reduction gear output shaft.

9. The joint driving device according to claim 1, further comprises:
    a mechanical brake, wherein
        the mechanical brake is arranged in a space on the inside of the first link or the second link.

10. The joint driving device according to claim 1, further comprises:
    a position detector, wherein
        the position detector is arranged in a space on the inside of the first link or the second link.

11. The joint driving device according to claim 1, further comprises:
    a motor driving circuit and a position detector processing circuit, wherein
        the motor driving circuit and the position detector processing circuit are arranged in the first link or the second link.

12. The joint driving device according to claim 1, wherein the stator of the motor is shrunk-fit or pressed-fit in the motor frame.

13. A robot comprising the joint driving device according to claim 1.

the wire body is connected to a circuit board or a connector in the housing space or the reduction gear output shaft outer cylinder and the transmission shaft outer cylinder.

14. A robot comprising the joint driving device according to claim 1.

15. The robot according to claim 14, wherein
the second link of the joint driving device turns in a direction in which the joint is bent with respect to the first link.

16. A robot according to claim 14, wherein
the second link of the joint driving device turns in a direction in which the joint is twisted with respect to the first link.

17. The joint driving device according to claim 1, wherein the transmission shaft is attached to the stator and engaged with the frame of the reduction gear and the first link.

18. The joint driving device according to claim 1, wherein the wire body is disposed wound around the transmission shaft.

* * * * *